United States Patent [19]

Suwala et al.

[11] Patent Number: 4,950,711

[45] Date of Patent: Aug. 21, 1990

[54] BLISTER-RESISTANT PAPER COATING LATEX

[75] Inventors: David W. Suwala; Igor B. Aksman, both of Dover, Del.

[73] Assignee: Reichhold Chemicals, Inc., White Plains, N.Y.

[21] Appl. No.: 383,231

[22] Filed: Jul. 19, 1989

Related U.S. Application Data

[63] Continuation-in-part of Ser. No. 295,435, Jan. 10, 1989, abandoned.

[51] Int. Cl.$^5$ ............................................. C08J 29/00
[52] U.S. Cl. .................................. 524/819; 524/820; 524/822; 524/823; 524/824; 524/742; 524/750; 524/777
[58] Field of Search ............... 524/820, 822, 823, 824, 524/742, 750, 777, 819

[56] References Cited

U.S. PATENT DOCUMENTS

| | | | |
|---|---|---|---|
| 3,847,855 | 11/1974 | Dawson | 524/777 |
| 4,429,074 | 1/1984 | Mishiba et al. | 524/819 |

FOREIGN PATENT DOCUMENTS

| | | | |
|---|---|---|---|
| 0765574 | 5/1971 | Belgium | 524/777 |
| 0969115 | 9/1964 | United Kingdom | 524/822 |
| 1014227 | 12/1965 | United Kingdom | 524/822 |

Primary Examiner—Joseph L. Schofer
Assistant Examiner—J. M. Reddick
Attorney, Agent, or Firm—Rodman & Rodman

[57] ABSTRACT

An improved blister resistant paper coating polymer latex comprising an aliphatic conjugated diene monomer, a monoolefinic monomer and an ethylenically unsaturated carboxylic acid monomer and including a molecular weight modifier such as an organosulfur compound and a soluble salt of a nonpolymerizable organic acid.

14 Claims, No Drawings

BLISTER-RESISTANT PAPER COATING LATEX

This is a continuation-in-part of application Ser. No. 295,435 filed Jan. 10, 1989, and now abandoned.

BACKGROUND OF THE INVENTION

1. Field of the Invention

The present invention relates to styrene-butadiene latices suitable for use as binders in coated papers to be printed by the web offset process.

2. Description of the Prior Art

The term "paper" is traditionally applied to felted or matted sheets of cellulose fibers, formed on a fine wire screen, such as in the Fourdrinier machine, from a dilute water suspension. The fibers are bonded together as the water is removed and the sheet is dried. The tendency of cellulose fibers to bond together, when dried from a water suspension is basic to papermaking technology.

Most of the water used in the manufacture of paper is removed mechanically when the web is carried through a series of press rolls. The sheet progresses to the drier section at about 33% consistency. Most of the remaining water is removed by evaporation. However, small amounts of water, on the order of about 2.5 to 5.0% by weight remain in the paper. These amounts of moisture are difficult to remove, and provide the web offset paper with the flexibility that is essential for handling.

An extremely dry web of paper would be brittle and tend to break when subjected to stresses in the web offset printing press. Even if an abnormally dry web of paper were to pass through a press without breaking, it would increase in size from the absorption of moisture from the air and it would be difficult to maintain register.

Paper that is to be printed upon is ordinarily coated with a pigment and latex binder to provide a smooth surface upon which a glossy, brilliant, detailed inked image is applied. The latex binder must be able to impart high ink holdout so that an image of maximum vividness and intensity can be obtained with as thin a film of ink as possible. The requirement that a latex impart high ink holdout, coupled with the use of extra adhesive to obtain sufficient surface strength for web offset printing has often resulted in a non-porous paper surface.

The printing of paper on a high speed web offset press requires the ink to dry very rapidly. The primary means for drying and setting the ink film is through evaporation of the solvent from the ink. This is often accomplished in a press dryer by impinging a gas flame or a high velocity stream of hot air on the printed web. The temperature of the air in a heatset dryer generally varies from about 500° to 600° F. The surface temperature of the web when it exits the dryer can reach temperatures as high as 375° F.

When the printed web is suddenly exposed to high temperature, the moisture in the paper is explosively vaporized. The vapor pressure must be allowed to exit through the coating or it will generate internal stresses within the paper. If the internal bonds are too weak to withstand the sudden outrush of vapor, an eruption in the form of a blister occurs on the paper surface.

Conventional styrene-butadiene-bound coatings have high ink holdout, low porosity and a marked tendency to blister. Traditionally, polyvinyl acetate latex binders have been used to alleviate the blister problem in web offset papers. See Walsh et al, "Polyvinyl Acetate Latex," TAPPI MONOGRAPH SERIES No. 37, p. 98 (1975) and Stoutjesdijk et al, PAPER TECHNOLOGY, vol. 15, no. 4, pages 209 to 212 (1974).

Unfortunately, polyvinyl acetate latex has often been implicated as the cause of deposits on the papermaking machinery referred to as "white pitch" which occurs when a significant amount of waste paper and trimmings, known as "broke," containing the polyvinyl acetate latex is recycled in the papermaking process.

Efforts have been made to develop a blister resistant styrene/butadiene binder. U.S. Pat. No. 4,429,074 to Mishiba et al discloses a coating composition for paper which comprises a mineral pigment and a polymer latex which is the product of emulsion polymerization of an aliphatic conjugated diene monomer, an ethylenically unsaturated carboxylic acid monomer, and a monoolefinic monomer in a weight proportion of 24.5 to 50:0.5 to 5:45 to 75 in the presence of carbon tetrachloride and an alkyl mercaptan.

The aforesaid Mishiba et al patent discloses that the combination of carbon tetrachloride and alkyl mercaptan in the polymerization of a polymer latex decreases the smell on irradiation by ultraviolet rays, improves adhesive strength, water resistance and blister resistance of the paper coated with such composition. Mishiba et al also discloses that the use of alkyl mercaptan alone, enhances the formation of coagula in the produced polymer latices, deteriorates mechanical stability and generates an unfavorable smell on irradiation with ultraviolet rays.

Hagymassy et al, "An Investigation of the Web Offset Blister Problem", TAPPI, Vol 61 pages 59–62 (January 1978) discloses styrene-butadiene binders with improved room temperature porosity but the resultant coatings blistered at lower temperatures than coatings with polyvinyl acetate, and the polymer failed to melt at the same temperature as does polyvinyl acetate.

The use of organosulfur compounds, such as mercaptans, as molecular weight modifiers and plasticizers in emulsion polymerization systems, including those for producing styrene-butadiene copolymers, is disclosed in U.S. Pat. Nos. 4,064,337 and 4,245,072 to Uraneck et al, U.S. Pat. No. 2,316,949 to Garvey, and U.S. Pat. No. 2,543,845 to Fryling.

SUMMARY OF THE INVENTION

The present invention relates to an improved blister resistant paper coating polymer latex comprising an aliphatic conjugated diene monomer, a monoethylenic monomer and an ethylenically unsaturated carboxylic acid monomer and including a molecular weight modifier such as an organosulfur compound and a soluble salt of a nonpolymerizable organic acid.

DESCRIPTION OF THE PREFERRED EMBODIMENTS

In accordance with the present invention, an improved polymeric latex for paper coating is produced from an aliphatic conjugated diene monomer, an ethylenically unsaturated carboxylic acid monomer, and a non-carboxylic monoethylenic monomer in the presence of an organosulfur molecular weight modifier and a soluble salt of a nonpolymerizable organic acid, in amounts sufficient to improve the blister resistance of paper coated with the polymeric latex. Notably, the inventive polymeric latex does not contain alkyl halides such as carbon tetrachloride or carbon tetrabromide which are considered objectionable to the environment. The Consumer Products Safety Commission has characterized carbon tetrachloride as a toxic and carcinogenic compound.

The inventive polymeric latex shows dramatically improved resistance to blistering of paper coatings under conditions that exist in the web offset drying oven wherein surface temperatures can reach 375° F. The result is faster printing speeds while retaining the improved rheological and printing characteristics associated with styrene-butadiene latexes.

The non-carboxylic monoethylenic monomer that is copolymerizable with the monomeric components can be an alkenyl aromatic compound, such as styrene, alpha-methylstyrene, methyl-alpha-methylstyrene, vinyltoluene, and hydroxyl-containing unsaturated compounds, such as beta-hydroxyethyl acrylate, beta-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol) maleate, di(ethylene glycol) itaconate, 2-hydroxyethyl maleate, bis(2-hydroxyethyl) maleate, 2-hydroxyethyl methyl fumarate); vinyl cyanide compounds, such as acrylonitrile, methacrylonitrile, and the like.

The amount of monoethylenic monomer can vary from about 10 to 90%, preferably about 30 to 70% by weight of the polymeric latex.

The aliphatic conjugated diene monomer can be 1,3-butadiene, 2-methyl-1,3-butadiene, 2-chloro-1,3-butadiene, and the like. The aliphatic conjugated diene monomer can vary from about 10 to 90%, preferably 30 to 70% by weight of the polymeric latex.

Ethylenically unsaturated carboxylic acid monomers include acrylic acid, methacrylic acid, itaconic acid, fumaric acid, maleic acid, and the like. The amount of ethylenically unsaturated acids can vary from about 1 to 20% by weight of the polymeric latex, and preferably about 3 to 10% by weight.

Other monomers that can be employed as part of the copolymerizable latex composition include alkyl esters of unsaturated carboxylic acids, such as methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, 2-ethyl-hexyl acrylate; vinylidene chloride. The amount of other monomers can vary from about 2 to 20% by weight of the polymeric latex, and preferably about 6 to 10% by weight.

Examples of the organosulfur molecular weight modifiers include mercaptans, mercaptoalcohols such as mercaptoethanol, diaryl disulfides such as diphenyl disulfide, and the like. Most preferred molecular weight modifiers include alkyl mercaptans, such as n-octyl mercaptan, n-dodecyl mercaptan, t-dodecyl mercaptan, t-hexadecyl mercaptan, t-tetradecyl mercaptan, n-tetradecyl mercaptan, and the like. The amount of molecular weight modifiers can vary from about 1.5 to 5%, and preferably about 2 to 3% by weight of the polymeric latex. It has been found that these higher levels of molecular weight modifiers provide significant improvements in blister resistance.

Also important in the blister resistant composition is the presence of water soluble salts of non polymerizable organic acids, such as acetic, oxalic, tartaric, citric and the like. Typical specific examples include sodium acetate, potassium citrate, sodium potassium tartarate, potassium oxalate and the like.

The presence of the water salt of the non-polymerizable organic acid unexpectedly promotes polymer molecular weight and structure formation that improves blister resistance of the coating, and also improves the rheological properties of the paper coating. The soluble salts of the non-polymerizable organic acids can vary from about 0.5 to 5% by weight of the latex, and preferably from about 1 to 3%.

The polymeric latex of the present invention is prepared by conventional emulsion polymerization techniques, such as described by Woods et al, Journal of Paint Technology, vol 40, p. 541 (1968). Anionic or nonionic surfactants can be used to stabilize the latex particles, such as salts of alkyl sulfates, sulfonates, sulfosuccinates, organic phosphate esters, and the like. Conventional initiators, such as persulfates, peroxides or red-ox compounds can be used to initiate polymerization.

The paper coating compositions of this invention comprise a finely divided mineral pigment, a polymeric latex binder as described above, natural or synthetic co-binders, and any of the paper coating additives well known to those skilled in the art, dispersed in a water medium.

Examples of the finely divided pigment include kaolin clays, calcium carbonate, titanium dioxide, zinc oxide, satin white and the like. The particle sizes of the pigments generally vary from about 0.5 to 2 microns on the average. Natural co-binders include starches, and proteins such as casein and soy protein which are usually chemically-modified to make them suitable for paper coating compositions. Polyvinyl alcohol is an example of a synthetic co-binder which is sometimes used.

Paper coating additives which are often used include dispersants such as polyphosphates and naphthalene sulfonates, foam control agents, viscosity-modifiers, water retention agents, lubricants, insolubilizers and preservatives. These paper coating additives are described in detail in the monograph "Paper Coating Additives" edited by Landes and Kroll (1978) which is incorporated by reference herein, and available from the Technical Association of Pulp and Paper Industries (TAPPI).

Typically, the coating composition comprises 100 parts pigment containing from about 65 to 100 parts clay and from about 0 to about 35 parts of at least one other pigment; about 0.1 to 0.4 parts dispersant; and from about 2 to 20 parts, preferably from about 10 to 18 parts of the latex binder; and about 0 to 10 parts of co-binder by weight. Each of the components above is mixed in an aqueous medium to yield a coating color composition which is about 60 to 75 percent solids by weight.

The coating compositions described herein may be applied to paper webs using any of the conventional coating devices such as blade coaters, air knife coaters, rod coaters, roll coaters and the like, by methods known to those skilled in the art.

The following examples serve to illustrate the specific embodiments of the present invention. All parts and percentages are by weight, unless otherwise indicated.

EXAMPLE 1(a)

An agitated autoclave was charged with 180 grams of distilled water, 2 grams of a 5% solution of the sodium salt of ethylene diamine tetraacetic acid, 3.5 grams of sodium lauryl sulfate (Sipex UB, Alcolac, Inc.), 4.1 grams of diisobutyl sodium sulfosuccinate (Monawet MB-45, Mona Industries, Inc .), 10.6 grams of a 20% solution organic phosphate ester (Gafac, RE 610, GAF Corp.), 2 grams of sodium acetate, 137.3 grams of styrene, 66.7 grams of butadiene. 3.92 grams of methacrylic acid, 4.9 grams of fumaric acid, and 5.5 grams of tert-dodecyl mercaptan. The autoclave was heated under agitation to 65° C. The reaction was then initiated with 2.4 grams of potassium persulfate. After agitating at 65° C. for 6 hours, the reaction was vacuum stripped to remove the unreacted monomer, cooled, and filtered. The resulting polymer latex had a non-volatile content of 49.7%.

EXAMPLES 1(b), 1(c) and 1(d)

The procedure of Example 1(a) was repeated, except for the following changes in components:

In Example 1(b) the tert-dodecyl mercpatan was eliminated.

In Example 1(c) the amount of tert-dodecyl mercaptan was reduced to 2 grams.

In Example 1(d) the sodium acetate was eliminated.

EXAMPLE 2(a)

Employing the same procedure as Example 1, a polymer was prepared using 110.3 grams of styrene, 91 grams of butadiene, 3.92 grams of methacrylic acid, and 4.9 grams of itaconic acid. 5.81 grams of dodecyl mercaptan and 2 grams of sodium acetate were used in the polymerization. The resulting polymer latex had a non-volatile content of 51%.

EXAMPLES 2(b), 2(c) and 2(d)

The procedure of Example 2(a) was repeated, except for the following changes in components:

In Example 2(b) the tert-dodecyl mercaptan was eliminated.

In Example 2(c), the amount of tert-dodecyl mercaptan was reduced to 2.0 grams.

In Example 2(d), the sodium acetate was eliminated.

EXAMPLE 3(a)

Using the same procedure as Example 1 a polymer was prepared using 78.5 grams of styrene, 120 grams of butadiene, 3.92 grams of methacrylic acid, and 4.9 grams of fumaric acid. 5.0 grams of dodecyl mercaptan and 2.0 grams of sodium acetate were also included. The resulting polymer latex had a non-volatile content of 51%.

EXAMPLE 3(b), 3(c) and 3(d)

The procedure of Example 3(a) was repeated, except for the following changes in components:

In Example 3(b), the tert-dodecyl mercaptan was eliminated.

In Example 3(c), the amount of tert-dodecyl mercaptan was reduced to 2 grams.

In Example 3(d), the sodium acetate was eliminated.

EXAMPLE 4

The polymer composition of Example 1 was prepared with 0.8 grams of dodecyl mercaptan and 16.0 grams of carbon tetrachloride as chain transfer agents. No sodium acetate salt was used in the run. This is consistent with the chain transfer agent used in Run No. 2 of U.S. Pat. No. 4,429,074 to Mishiba et al. The resulting polymer had a non-volatile content of 50.1%.

EXAMPLE 5

The polymeric latex of Examples 1(a), 2(a) and 3(a) as well as some commercially available polystyrene-butadiene and polyvinyl acetate paper coating latices were applied to both sides of 62 lb basestock paper with a wire-wound rod. Each side of the paper was coated with eight lbs. of polymer/3000 ft$^2$ and the resulting double-coated paper contained about 10% moisture.

A stainless steel beaker was filled to a height of about three inches with a high temperature silicone fluid (GE SF1154, General Electric Co.) prepared by heating it to 500° F. for 2 hours with 0.1 part active iron octoate (Nuodex TM, Tenneco Chemicals). The silicone fluid was then heated on a hot plate to 525° F. A 2×2 inch square of the paper coated as described above was immersed into the hot fluid. If blisters were observed, the silicone oil bath was removed from the hot plate and allowed to cool 10 degrees and another square was immersed into the oil. The temperature at which blistering occurred was determined in this manner. The results with Examples 1(a), 2(a) and 3(a) and commercially available paper coating latices were as follows

|  | Temperature (°F.) |
| --- | --- |
| Example 1(a) | >525 |
| Example 2(a) | >525 |
| Example 3(a) | 1 525 |
| Commercial SB #1 (Reichhold 68-414) | 300 |
| Commercial SB #2 (Polysar 4305) | 330 |
| Commercial SB #3 (Dow 685) | 310 |
| Commercial polyvinyl-acetate (Reichhold 40-447) | >525 |

It can be seen that the polymeric latices from the examples did not blister at the upper limit of this test, while commercial styrene-butadiene polymers erupted into blisters at temperatures varying from 300° to 330° F.

EXAMPLE 6

The viscosity of each of the latices in Examples 1(a)-(d), 2(a)-(d), and 3(a)-(d) was measured with a Brookfield Synchro-lectric viscometer Model HAT with the #2 bob at 20 rpm, with the results tabulated in the Table following this example.

Coating color compositions (63% solids) were prepared using each of the polymer latices from Examples 1(a)-(d), 2(a)-(d) and 3(a)-(d) in accordance with the following formulation:

|  | Amount (parts) |
| --- | --- |
| Ultrawhite 90 clay (Engelhard) | 100 |
| Polymer Latex (dry solids) | 10.8 |
| Penford 280 gum (Penick & Ford) | 1.2 |
| tetrasodium pyrophosphate (TSPP) | 0.08 |

The TSPP dispersant was dissolved in water, after which the clay was added to produce a clay slurry of 66.3% solids. The Penford gum was cooked at 25% solids for 10 minutes at 200° F. under agitation and then added to the clay slurry. Separate samples were then prepared for each of the latices by mixing in under agitation the appropriate amount of each latex to give the amount of dry solids as indicated in the above formulation. Each color formulation was adjusted to a pH of 8.5 with aqueous ammonia.

The viscosity of each coating color composition with the Example latices were measured with a Brookfield Synchro-lectric viscometer Model HAT with the #3 bob at 20 rpm. A rheogram was recorded on a Hercules high-shear viscometer Model EC24-6 with the A bob and the 400,000 dyne spring for each of the Example latices. Results are tabulated in Table 1 following this example.

Each coating color composition was applied at a rate of 10 lbs/3000 ft$^2$ to both sides of a 49 lb base paper having a moisture content of about 4%. After drying at 260° F. for 15 seconds, the coating paper was calendered 4 nips through a B. F. Perkins laboratory calender at 1200 psi, 130° F. and 100 ft./min. The coated paper was conditioned at 50% relative humidity and 23° C. The percent moisture was about 4% under these conditions.

The coated papers were subjected to several standard paper coating tests including gloss, (Hunter 75°), printed gloss, brightness, (Martin Sweets Standard color brightness tester), roughness (Parker Print-Surf), porosity (Sheffield) and wet rub (Adams) and a printed blister test.

The gloss print was made on a Prufbau printability tester. The machine was set at a speed of one meter/second and a force of 1000 Newtons. A volume of 0.3 milliliters of Suntec 1300 ink was applied to each print ($1\frac{7}{8} \times 10$ inch printed area). The test prints were cured in a microwave oven (General Electric Spacemaker III, Model No. JEM4G 001, 1.0 Kilowatts) on high for two minutes. The samples were printed and tested in the machine direction The gloss was measured with a 75° glossmeter (Model 48-7, Hunterlab Assoc. Lab., Inc.).

The blister test was conducted as follows: A $3 \times 6\frac{1}{2}$ inch area of the double coated paper was printed on both sides with Suntec 1300 ink offset from a Warren #3 block (Precision Gage & Tool Co., Dayton, Ohio) milled to a depth of 4 mils on a Vandercook proof press. The sample was then passed through a 1000° F. oven at a speed such that its surface temperature at the exit of the oven was 310° F. The number of blisters within the test area were counted to give an indication of the tendency of the coating to blister. The results of these tests are tabulated in Table 2 which follows:

TABLE 1

|  | VISCOSITY | | | |
|---|---|---|---|---|
|  | BROOKFIELD | | HERCULES | |
|  | LATEX | COLOR | 4.4K | 2.2K |
| Example 1(a) | 588 | 510 | 81 | 84 |
| Example 2(a) | 425 | 530 | 96 | 74 |
| Example 3(a) | 580 | 710 | 95 | 87 |
| Example 4 | 12000 | 1010 | 212 | 138 |
| Commercial SB #1[a] | 120 | 760 | 99 | 79 |
| Commercial SB #2[b] | 350 | 500 | 47 | 42 |
| Commercial SB #3[c] | 200 | 725 | 109 | 87 |
| Commercial PVAc[d] | 50 | 630 | 45 | 43 |

[a]Reichhold Tylac ™ 68-414
[b]Polysar 4305
[c]Dow 685
[d]Reichhold Synthemul ™ 40-447

TABLE 2

| Ex. No. | Styrene, grams | Butadiene, grams | Methacrylic acid, grams | Fumaric acid, grams | Itaconic acid, grams | T-dodecyl Mercaptan, grams | Sodium acetate, grams |
|---|---|---|---|---|---|---|---|
| 1(a) | 137.3 | 66.7 | 3.92 | 4.90 | — | 5.50 | 2.00 |
| 1(b) | 137.3 | 66.7 | 3.92 | 4.90 | — | 0.00 | 2.00 |
| 1(c) | 137.3 | 66.7 | 3.92 | 4.90 | — | 2.00 | 2.00 |
| 1(d) | 137.3 | 66.7 | 3.92 | 4.90 | — | 5.50 | — |
| 2(a) | 110.3 | 91.0 | 3.92 | — | 4.90 | 5.81 | 2.00 |
| 2(b) | 110.3 | 91.0 | 3.92 | — | 4.90 | 0.00 | 2.00 |
| 2(c) | 110.3 | 91.0 | 3.92 | — | 4.90 | 2.33 | 2.00 |
| 2(d) | 110.3 | 91.0 | 3.92 | — | 4.90 | 5.81 | — |
| 3(a) | 78.5 | 120.0 | 3.92 | 4.90 | — | 5.00 | 2.00 |
| 3(b) | 78.5 | 120.0 | 3.92 | 4.90 | — | 0.00 | 2.00 |
| 3(c) | 78.5 | 120.0 | 3.92 | 4.90 | — | 2.00 | 2.00 |
| 3(d) | 78.5 | 120.0 | 3.92 | 4.90 | — | 5.00 | — |
| 4 | 137.3 | 66.7 | 3.92 | 4.90 | — | 0.8* | — |
| SB #1[a] | | | Analysis not available | | | | |
| SB #2[b] | | | " | | | | |
| SB #3[c] | | | " | | | | |
| PVAc[d] | | | " | | | | |

| Ex. No. | Hunter Gloss | Inked Gloss | Brightness | Roughness | Porosity | Adams Wet Rub | Print Blister |
|---|---|---|---|---|---|---|---|
| 1(a) | 81.2 | 87.0 | 80.8 | 0.96 | 29 | 95.8 | 4 |
| 1(b) | 78.2 | 84.0 | 79.2 | 1.27 | 27 | — | 25+ |
| 1(c) | 77.0 | 90.4 | 80.9 | 1.29 | 30 | — | 25+ |
| 1(d) | 76.1 | 79.0 | 81.1 | 1.29 | 33 | — | 22 |
| 2(a) | 78.2 | 87.7 | 81.3 | 1.19 | 41 | 87.6 | 0 |
| 2(b) | 78.5 | 88.8 | 79.0 | 1.21 | 24 | — | 25+ |
| 2(c) | 78.8 | 92.0 | 81.1 | 1.16 | 21 | — | 25+ |
| 2(d) | 77.9 | 85.2 | 81.2 | 1.16 | 39 | — | 25+ |
| 3(a) | 79.6 | 82.8 | 82.1 | 0.93 | 43 | 88.2 | 0 |
| 3(b) | 77.7 | 84.7 | 79.0 | 1.19 | 23 | — | 25+ |
| 3(c) | 78.8 | 88.8 | 81.1 | 1.11 | 20 | — | 25+ |
| 3(d) | 80.2 | 75.2 | 81.1 | 1.08 | 29 | — | 25+ |
| 4 | 74.0 | 83.6 | 82.0 | 1.08 | 32 | 87.6 | 0 |
| SB #1[a] | 80.2 | 88.4 | 79.9 | 0.78 | 18 | 87.7 | 25+ |
| SB #2[b] | 79.9 | 90.3 | 81.0 | 1.22 | 25 | 88.8 | 25+ |
| SB #3[c] | 76.3 | 88.6 | 80.5 | 1.30 | 29 | 81.2 | 22 |

TABLE 2-continued

| | | | | | | | |
|---|---|---|---|---|---|---|---|
| PVAc[d] | 72.0 | 82.9 | 82.4 | 1.35 | 37 | 88.6 | 2 |

[a]Reichhold Tylac ™ 68-414
[b]Polysar 4305
[c]Dow 685
[d]Reichhold Synthemul ™ 40-447
*plus 16 grams carbon tetrachloride The latex viscosities for Examples 1(a), 2(a) and 3(a) were 425 centipoise or greater, which was slightly more than that measured for the three commercial styrene-butadiene latices. The latex viscosity of Example 4, made according to the procedure described in U.S. Pat. No. 4,429,074 to Mishiba et al had a viscosity of 12,000 centipoise. This is one hundred times the viscosity of the commercial styrene-butadiene latex #1, which was 120 centipose. The high latex viscosity of Example 4 made the stripping of this latex extremely difficult and would make the pumping and transfer of this latex almost impossible.

In Table 1, the coating color Brookfield viscosity of the latex of Example 4 was twice that of the best of the commercial styrene-butadiene latices (#2). The Hercules viscosity at 4400 rpms with the Example 4 latex was four times that of the commercial styrene-butadiene latex #2. Low color viscosity at high shear rates is usually considered to be a requirement for high speed blade coater runnability. The latices of Examples 1(a), 2(a) and 3(a) would be indistinguishable from most commercial styrene-butadiene latices in this respect.

One of the primary advantages of styrene-butadiene latices is that they paper coatings with high surface gloss. This is seen in Table 2 where the Hunter gloss value of commercial latices #1, #2 and #3 range form 76.3 to 80.2. The hunter gloss of coatings with the inventive latices of Examples 1(a), 2(a) and 3(a) ranged from 79.6 to 81.2. The Hunter gloss value of Example 4 using the chain transfer agent of the Mishiba patent was 74, which is not significantly higher than that of the commercial polyvinylacetate latex.

Printers consider a high gloss coated paper as a means for obtained higher printed gloss, thereby enabling them to obtain crisper images with a thinner ink film. The inked gloss with commercial styrene-butadiene latices #1, #2 and #3 ranged from 88.4 to 90.3. With Examples 1(a) and 2(a) representing the invention, the high surface gloss resulted in inked printed glosses of 87.0 and 87.7, respectively. The inked gloss of 83.6 in Example 4 was close to the 82.9 measured with the commercial polyvinylacetate latex.

Styrene-butadiene latices usually produce coatings which are low in porosity. This is seen in Table 2 where porosities ranging from 18 to 29 were measured for the commercial styrene-butadiene (SB) latices using the same particular coating color formulation as the other examples. Extensive blistering occurred with prints on paper coated with coating colors containing each one of the commercial SB latices tested, when passed through a 1000° F. oven.

As shown in Table 2, a count of 25+ print blisters means that the number of blisters were greater than 25 and too many to count. Remarkably, the porosity of paper coated with Examples 2(a) and 3(a) was in excess of 40, much higher than that with the commercial polyvinylacetate latex. The resistance to blistering of Examples 1(a), 2(a), 3(a) and 4 is demonstrated by print blister numbers ranging from 0 to 4, which is within experimental error of the number observed with commercial polyvinylacetate.

That the styrene-butadiene latices can give coated paper of high surface gloss while exhibiting coating porosities and resistance to blistering that is more characteristic of polyvinylacetate binders is totally unexpected. Latices made using the chain transfer agent of U.S. Pat. No. 4,429,074 to Mishiba et al did not produce paper coatings with both high gloss and resistance to blistering.

EXAMPLE 7

The latices of Examples 1, 2 and 3 of British patent specification No. 969,115 were reproduced in accordance with the procedure described therein. Each latex was then tested in accordance with the procedure of Example 6 of this invention. The results are tabulated in Table 3, which follows, with the properties of Example 2(a) of this invention also included for purposes of comparison.

TABLE 3

| British Patent Spec. 969,115 | Hunter Gloss | Inked Gloss | Brightness | Roughness | Porosity | Print Blister |
|---|---|---|---|---|---|---|
| Example 1 | 75.7 | 86.2 | 80.8 | 1.42 | 27 | 25+ |
| Example 2 | 75.8 | 87.5 | 80.8 | 1.17 | 27 | 25+ |
| Example 3 | 75.2 | 84.6 | 80.8 | 1.23 | 30 | 25+ |
| Example 2(a) (this invention) | 78.2 | 87.7 | 81.3 | 1.19 | 41 | 0 |

What is claimed is:

1. In a coating composition for paper comprising a polymer latex prepared by emulsion polymerizing:
   (a) an aliphatic conjugated diene monomer,
   (b) an non-carboxylic monoethylenic monomer, and
   (c) an ethylenically unsaturated carboxylic acid monomer, the improvement which consists essentially of conducting the polymerization in the absence of an alkyl halide and in the presence of about 1.5 to 5% by weight of an organosulfur molecular weight modifier and about 0.5 to 5% by weight of a water soluble salt of a non-polymerizable organic acid.

2. The composition of claim 1 wherein the monoethylenic monomer is at least one selected from the group consisting of styrene, alpha-methylstyrene, methyl-alpha-methylstyrene, vinyltoluene, beta-hydroxyethyl acrylate, beta-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol) maleate, di(ethylene glycol) itaconate, 2-hydroxyethyl maleate, bis(2-hydroxyethyl) maleate, 2-hydroxyethyl methyl fumarate), acrylontrile, and methacrylonitrile.

3. The composition of claim 1, wherein the monoethylenic monomer varies from about 10% to 90% by weight of the polymeric latex.

4. The composition of claim 2, wherein the monoethylenic monomer is styrene.

5. The composition of claim 1, wherein the aliphatic conjugated diene monomer is at least one selected from the group consisting of 1,3-butadiene, 2-methyl-1,3-butadiene, and 2-chloro-1,3-butadiene.

6. The composition of claim 1, wherein the aliphatic conjugated diene monomer is butadiene.

7. The composition of claim 1, wherein the amount of aliphatic conjugated diene monomer varies from about 10 to 90% by weight of the polymeric latex.

8. The composition of claim 1, wherein the ethylenically unsaturated carboxylic acid monomers include at least one selected from the group consisting of acrylic acid, methacrylic acid, itaconic acid, fumaric acid, and maleic acid.

9. The composition of claim 1, wherein the ethylenically unsaturated carboxylic acid monomers very from about 1 to 20% by weight of the polymer latex.

10. The composition of claim 1, wherein the organosulfur molecular weight modifiers include at least one selected from the group consisting of mercaptans, mercaptoalcohols, and diaryl disulfides.

11. The composition of claim 1, wherein the soluble salts of non-polymerizable organic acids are derived from at least one acid selected from the group consisting of acetic, oxalic, tartaric, and citric.

12. The composition of claim 11, wherein said soluble salts include at least one selected from the group consisting of sodium acetate, potassium citrate, sodium potassium tartarate, and potassium oxalate.

13. The composition of claim 1, also including a finely divided mineral pigment and dispersant.

14. The composition of claim 13, wherein the coating composition exists in aqueous media which contains about 60 to 75% total solids, by weight.

* * * * *

UNITED STATES PATENT AND TRADEMARK OFFICE
CERTIFICATE OF CORRECTION

PATENT NO. : 4,950,711
DATED : August 21, 1990
INVENTOR(S) : SUWALA et al

It is certified that error appears in the above-identified patent and that said Letters Patent is hereby corrected as shown below:

At column 4, line 1, after "water" insert --soluble--.

At column 5, line 18, change "mercpatan" to --mercaptan--.

At column 6, line 29, change "1 525" to -->  525 --.

At column 9, line 18, change "centipose" to -- centipoise--.

At column 9, line 33, after "they" insert --yield--.

At column 9, line 35, change "form" to --from--.

Signed and Sealed this

Thirty-first Day of March, 1992

Attest:

HARRY F. MANBECK, JR.

Attesting Officer

Commissioner of Patents and Trademarks